(12) United States Patent
Leonard et al.

(10) Patent No.: US 10,295,773 B2
(45) Date of Patent: May 21, 2019

(54) SEGREGATED FIBER IN A SPLICE CASSETTE

(71) Applicant: Leviton Manufacturing Co., Inc., Melville, NY (US)

(72) Inventors: James Leonard, Glenrothes (GB); Jonathon Marks, Glenrothes (GB)

(73) Assignee: Leviton Manufacturing Co., Inc., Melville, NY (US)

( * ) Notice: Subject to any disclaimer, the term of this patent is extended or adjusted under 35 U.S.C. 154(b) by 0 days.

(21) Appl. No.: 15/937,328

(22) Filed: Mar. 27, 2018

(65) Prior Publication Data

US 2018/0284379 A1 Oct. 4, 2018

Related U.S. Application Data

(60) Provisional application No. 62/478,435, filed on Mar. 29, 2017.

(51) Int. Cl.
*G02B 6/44* (2006.01)
(52) U.S. Cl.
CPC ................. *G02B 6/4454* (2013.01)
(58) Field of Classification Search
CPC ........................... G02B 6/4453; G02B 6/4454
See application file for complete search history.

(56) References Cited

U.S. PATENT DOCUMENTS

| 4,283,150 A | 8/1981 | Hanazono et al. |
| 4,528,728 A | 7/1985 | Schmidt et al. |
| 4,659,119 A | 4/1987 | Reimert |
| 4,692,809 A | 9/1987 | Beining et al. |
| 4,944,568 A | 7/1990 | Danbach et al. |
| 5,004,866 A | 4/1991 | Cooke et al. |
| 5,312,263 A | 5/1994 | Zapalski et al. |
| 5,713,752 A | 2/1998 | Leong et al. |

(Continued)

FOREIGN PATENT DOCUMENTS

| CA | 2 880 810 A1 | 2/2014 |
| CN | 203012204 U | 6/2013 |

(Continued)

OTHER PUBLICATIONS

Brand-Rex "High Density Fibre Cabling Cabinet", Datasheet GD061719v4, pp. 1-4 (2016).

*Primary Examiner* — Omar R Rojas
(74) *Attorney, Agent, or Firm* — Amin, Turocy & Watson, LLP

(57) ABSTRACT

A fiber optic cassette includes structural features that maintain segregation between incoming and outgoing optical fibers. A dividing wall and a set of splice holders within the cassette together define two separate chambers within the cassette. Cable entry openings on the rear end of the cassette are configured to receive fiber optic cables into the rear chamber defined by the dividing wall and the splice holders. The front chamber is configured to hold patching fibers that interface with fiber optic adapters on the front of the cassette. The patching fibers and incoming optical fibers can be spliced as needed, and the splices held in place by the splice holders. This arrangement ensures that the incoming optical fibers from the fiber optic cable and the patching fibers remain segregated, such that the splice points are the only points of contact between the two sets of fibers.

20 Claims, 9 Drawing Sheets

(56) References Cited

U.S. PATENT DOCUMENTS

| | | |
|---|---|---|
| 5,781,366 A | 7/1998 | Matsuoka |
| 6,485,322 B1 | 11/2002 | Branch et al. |
| 6,607,308 B2 | 8/2003 | Dair et al. |
| 6,626,697 B1 | 9/2003 | Martin et al. |
| 6,796,715 B2 | 9/2004 | Chiu et al. |
| 7,160,138 B2 | 1/2007 | Ishigami et al. |
| 7,201,411 B2 | 4/2007 | Bella et al. |
| 7,298,946 B2 | 11/2007 | Mueller |
| 7,314,318 B2 | 1/2008 | Anderl et al. |
| 7,347,633 B2 | 3/2008 | Minota |
| 7,473,131 B2 | 1/2009 | Dunwoody et al. |
| 7,509,015 B2 | 3/2009 | Murano |
| 7,689,089 B2 | 3/2010 | Wagner et al. |
| 7,841,779 B1 | 11/2010 | Bianchini et al. |
| 8,062,049 B2 | 11/2011 | Tobey |
| 8,147,272 B2 | 4/2012 | Rhein |
| 8,337,243 B2 | 12/2012 | Elkhatib et al. |
| 8,454,254 B2 | 6/2013 | Hargreaves et al. |
| 8,488,934 B2 * | 7/2013 | Zhou .................... G02B 6/4454 385/135 |
| 8,740,478 B2 | 6/2014 | Weberpals |
| 8,781,284 B2 | 7/2014 | Bragg |
| 8,958,680 B2 | 2/2015 | Bragg |
| 9,077,126 B2 | 7/2015 | Bragg |
| 9,116,324 B2 | 8/2015 | Cooke et al. |
| 9,236,691 B2 | 1/2016 | Bragg |
| 9,690,064 B2 | 6/2017 | Sauter et al. |
| 9,778,433 B2 | 10/2017 | Kostecka et al. |
| 2010/0322580 A1 | 12/2010 | Beamon et al. |
| 2014/0226946 A1 | 8/2014 | Cooke et al. |
| 2018/0129005 A1 * | 5/2018 | Smith .................. G02B 6/4454 |

FOREIGN PATENT DOCUMENTS

| | | |
|---|---|---|
| CN | 203573012 U | 4/2014 |
| CN | 204925469 U | 12/2016 |
| CN | 205787267 U | 12/2016 |
| EP | 3 374 813 A1 | 9/2018 |
| MX | 2018005310 A | 8/2018 |
| WO | 2014/021901 A1 | 2/2014 |
| WO | 2017/083256 A1 | 5/2017 |

* cited by examiner

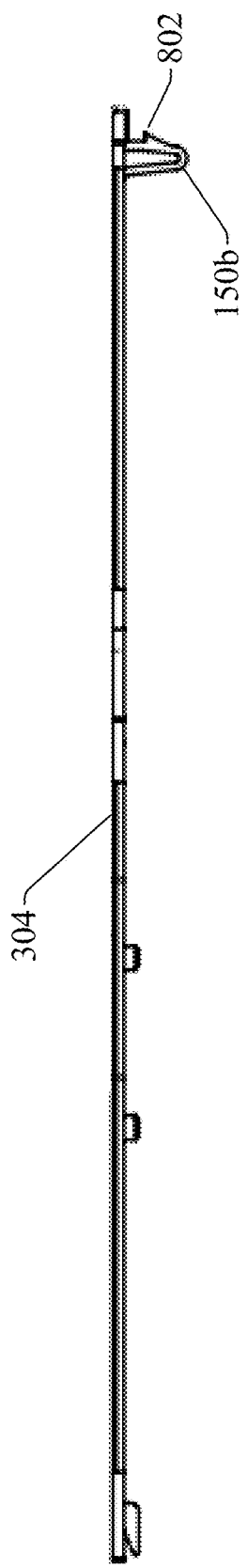

SEGREGATED FIBER IN A SPLICE CASSETTE

RELATED APPLICATION

The subject patent application claims priority to U.S. Provisional Patent Application No. 62/478,435, filed Mar. 29, 2017, and entitled "SEGREGATED FIBER IN A SPLICE CASSETTE," the entirety of which application is hereby incorporated by reference herein.

TECHNICAL FIELD

The disclosed subject matter relates generally to fiber optic cassettes or fiber optic housings.

BACKGROUND

Fiber optic cables are often used as a medium for telecommunication and computer networking due to their flexibility, high data capacity, and immunity to interference. Since light is used as the data transmission medium, fiber optic cables can carry data over long distances with little attenuation relative to electrical data transmission. Fiber optic cables are used in many types of applications, including local area networks that use optical transceivers, corporate intranets that deploy optical pathways for high-speed transmission of data on a corporate campus, or other such data transmission applications.

Fiber optic cassettes are often used to organize and manage fiber optic connections within telecommunication wiring enclosures. An example cassette-based system may include a fiber optic enclosure within which are installed one or more fiber optic trays, with one or more fiber optic cassettes mounted on each tray.

Organizing and managing the optical fibers housed in a fiber optic cassette can be challenging, particularly in the case of high-density fiber cassettes in which a large number of fibers are routed from the rear entrance of the cassette to the fiber optic adapters through which the fibers interface with external fiber optic connectors.

The above-described deficiencies of communication connector systems are merely intended to provide an overview of some of the problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Various embodiments described herein relate to a fiber optic cassette having structural features that facilitate optical fiber organization and management. In one or more embodiments, the interior of the fiber optic cassette comprises a dividing wall that, together with splice holders mounted inside the cassette, define rear and front chambers that maintain segregation between incoming optical fibers entering from the rear of the cassette and patching fibers that interface with fiber optic adapters on the front end of the cassette. Each chamber includes a winding area in which excess lengths of the incoming optical fibers and the patching fibers can be wound around a winding structure. The dividing wall and a guiding wall define fiber routing pathways between various sections of the fiber optic cassette, while ensuring that the incoming optical fibers and the patching fibers remain segregated, such that the only point of contact between the incoming fibers and the patching fibers are the splice points between the incoming and patching fibers.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

BRIEF DESCRIPTION OF DRAWINGS

FIG. 9 is a side view of a cover including two clips.

DETAILED DESCRIPTION

Figure 1:
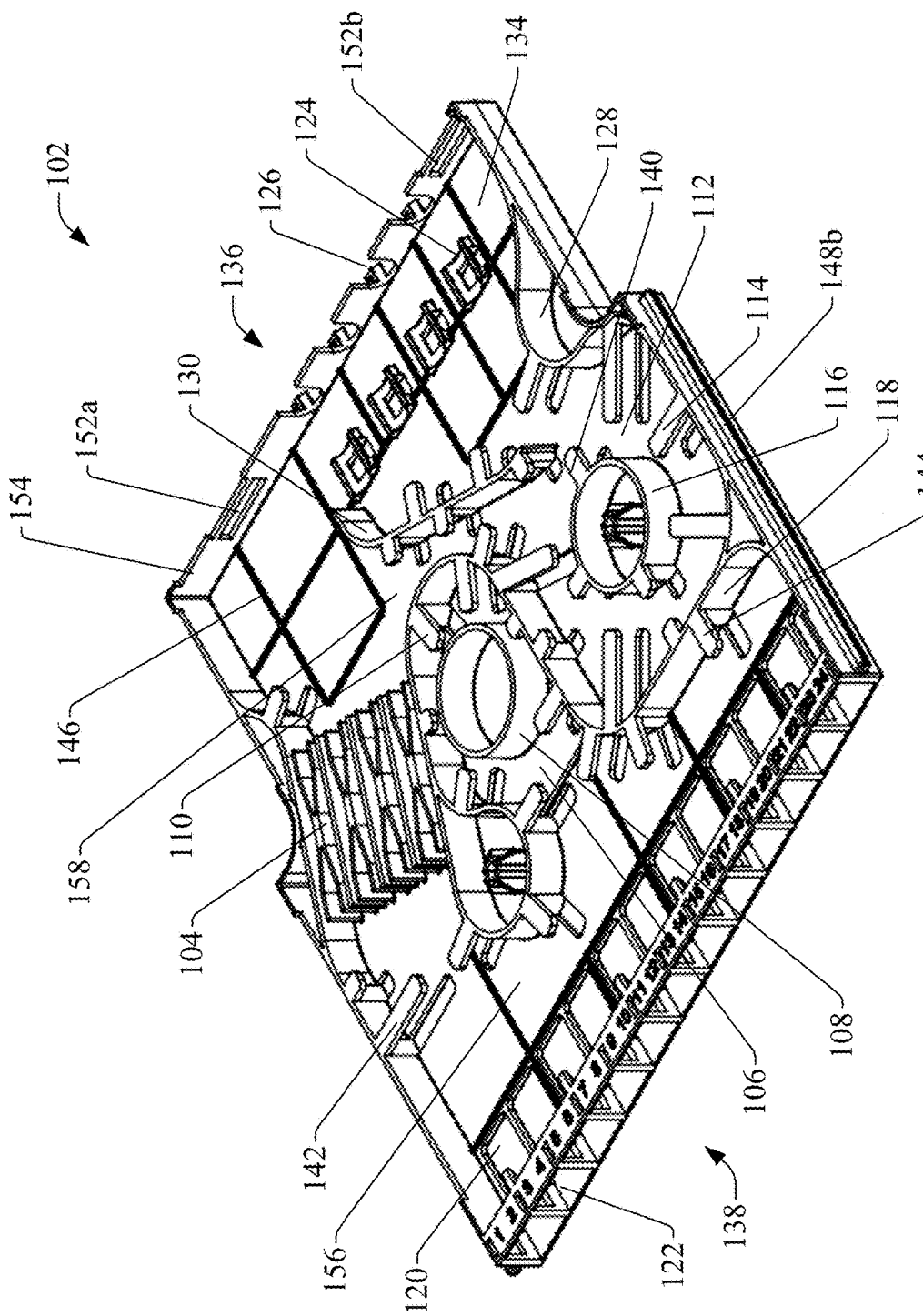
FIG. 1 is a perspective view of an example fiber optic cassette.

The subject disclosure is now described with reference to the drawings wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Figure 2:
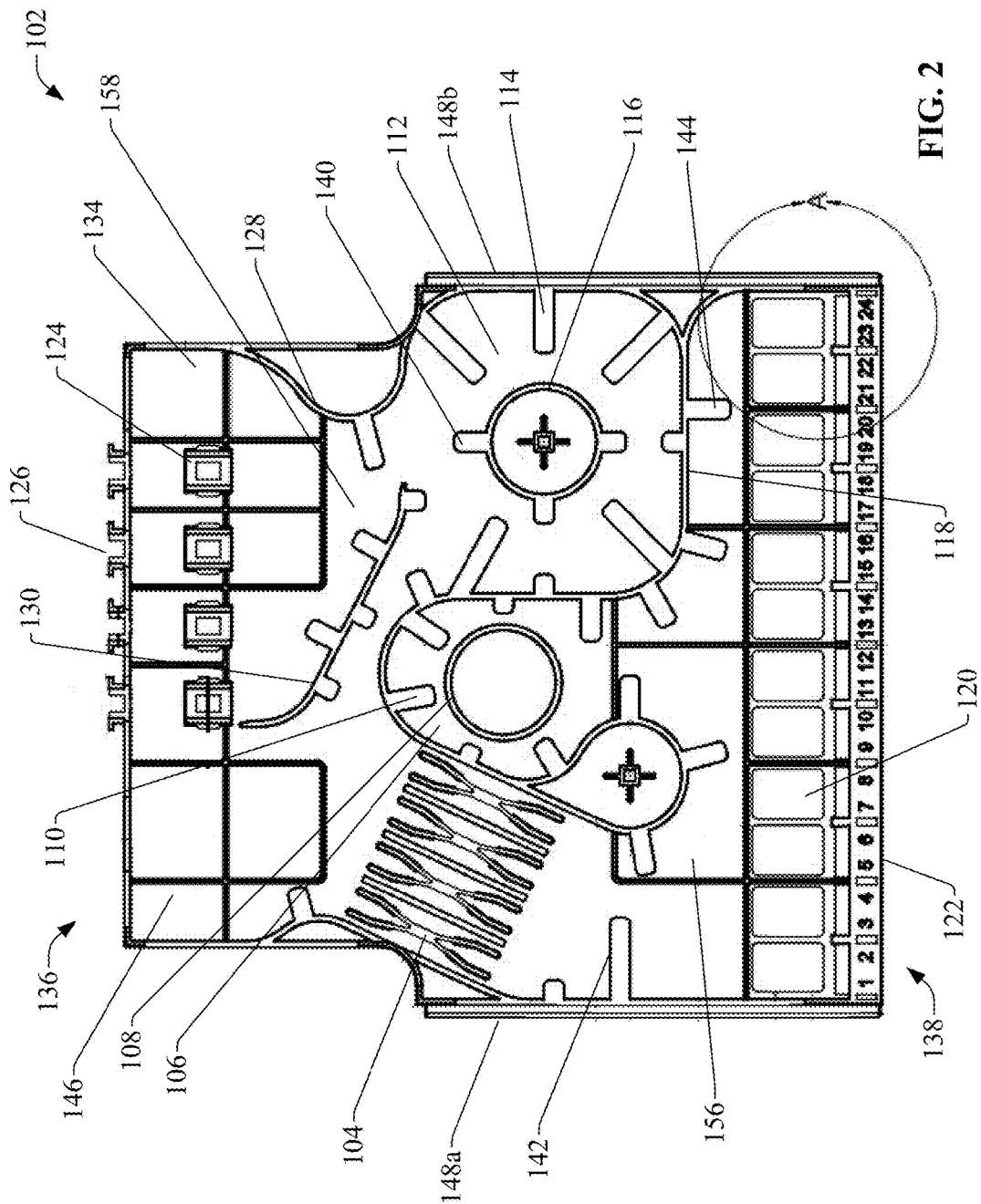
FIG. 2 is a top view of the example fiber optic cassette.
Figure 3:
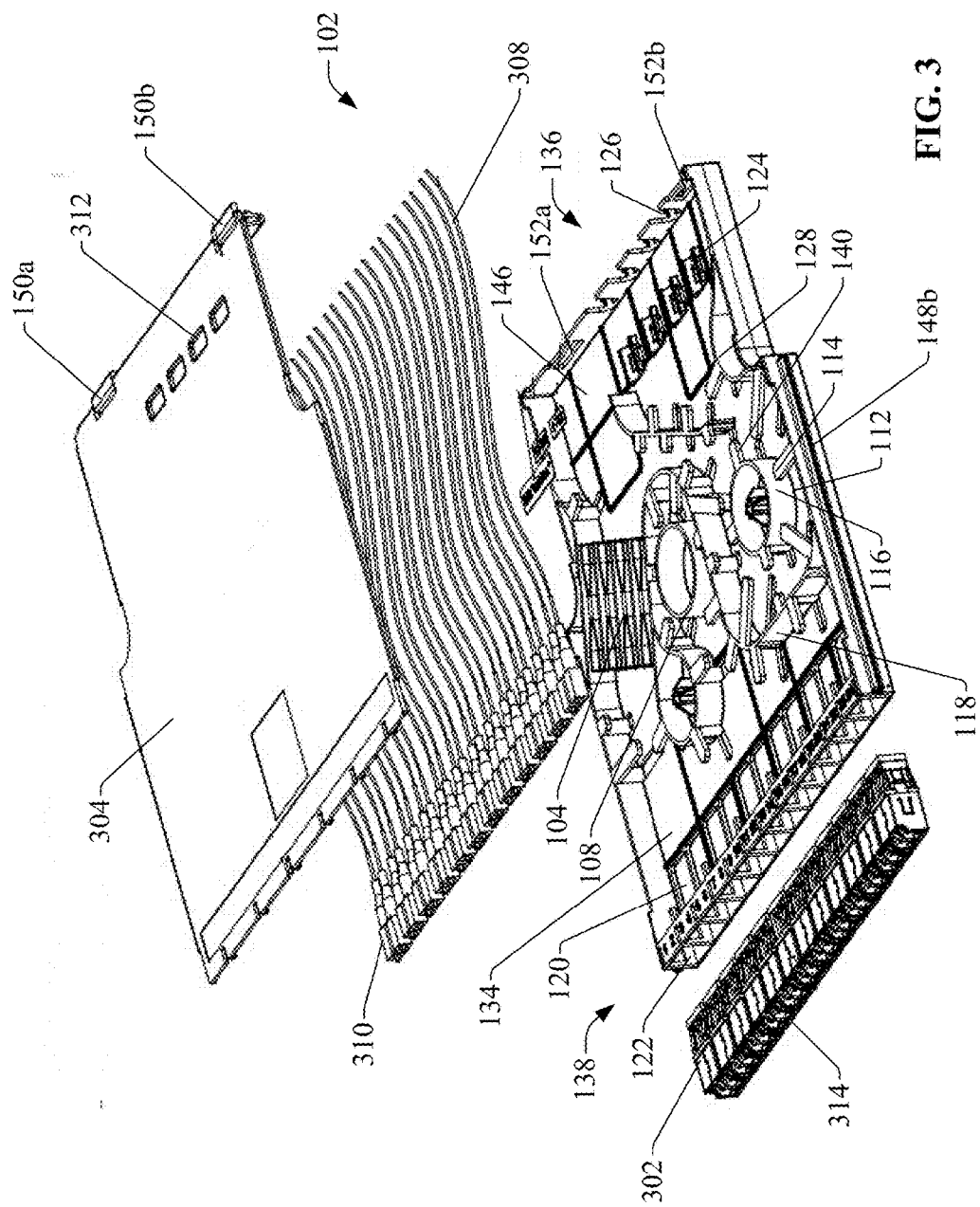
FIG. 3 is an exploded view of the example fiber optic cassette including fiber optic adapters, patching fibers, and a cover.

FIG. 1 is a perspective view of an example fiber optic cassette 102 according to one or more embodiments. FIG. 2 is a top view of fiber optic cassette 102. FIG. 3 is an exploded view of fiber optic cassette 102 including fiber optic adapters 302, patching fibers 308, and a cover 304. As will be described in more detail herein fiber optic cassette 102 includes structural features that maintain segregation between incoming and outgoing (patching) optical fibers, facilitating easy access to individual fibers within the cassette and a high level of fiber organization within the cassette.

Fiber optic cassette 102 can have any suitable size according to the needs of a given fiber optic management application. For example, the width of fiber optic cassette can correspond to the width of a cassette bay of a fiber optic tray (not shown) on which the fiber optic cassette 102 will be mounted, such as a fiber optic tray that can be installed within a fiber optic enclosure or cabinet. For applications in which the fiber optic cassette 102 will be mounted directly in a fiber cabling cabinet (e.g., a high density fiber cabling cabinet) the dimensions of fiber optic cassette 102 can correspond to a cassette bay of the cabinet. In the embodiment depicted in FIGS. 1-8, mounting rails 148a and 148b are formed on the left and right exterior sides of fiber optic cassette 102, and are configured to engaged with corresponding mounting structures (e.g., rail guides) of a fiber optic cassette tray or fiber cabling cabinet (not shown).

In the illustrated example, four rear entrance openings 126 are located along a rear end 136 of the fiber optic cassette 102. Rear entrance openings 126 are configured to receive respective fiber optic cables (e.g., trunk cables), each fiber optic cable containing multiple individual optical fibers. Rear entrance openings 126 can be designed to accommodate any suitable size of fiber optic cable (e.g., nine millimeter diameter, 24 fiber premises distribution cable, or another type of fiber optic cable). A cable fixing point 124 is located on a bottom inside surface 134 of the fiber optic cassette 102 near each of the rear entrance openings 126. Cable fixing point 124 is configured to receive a cable tie or other attachment mechanism capable of holding its respective fiber optic cable in place on the bottom inside surface 134 of the fiber optic cassette 102. Cable fixing point 124 is substantially aligned with its corresponding rear entrance opening 126 so that a fiber optic cable entering through the rear entrance opening 126 passes over the cable fixing point 124, allowing the fiber optic cable to be attached to the cable fixing point 124. In the illustrated example, each cable fixing point 124 comprises a curved cradle within which a fiber optic cable can rest, where an aperture is formed on each side of the cradle to allow a cable tie or other attachment mechanism to pass through.

A row of fiber adapter receptacles 122 are located along the front end 138 of fiber optic cassette 102. Each fiber adapter receptacle 122 is configured to receive and hold a fiber optic adapter 302 (see, e.g., FIG. 3) inserted through the front of the fiber adapter receptacle 122. In some embodiments, each fiber adapter receptacle 122 can include a hinged shutter that covers the opening of the fiber adapter receptacle 122 when a fiber optic adapter 302 is not installed in the fiber adapter receptacle 122. As shown in FIG. 3, patching fibers 308 housed inside the fiber optic cassette 102 are terminated with respective connectors 310, which can be plugged into the rear sides of fiber optic adapters 302. Fiber optic adapters 302 provide connectivity between the patching fibers 308 terminated on the rear side of fiber optic adapters 302 and connectorized external fibers (not shown) terminated on the front sides of fiber optic adapters 302 using other fiber optic connectors that plug into adapter receptacles 314 within the fiber optic adapters 302. In some embodiments, a hinged shutter (not shown) can reside within the receptacle 314 of each fiber optic adapter 302, where the hinged shutter is configured to cover the opening of the fiber optic adapter 302 while a connectorized external optical fiber is not plugged into the front of the fiber optic adapter 302. Fiber adapter receptacles 122 can be configured to accommodate any suitable type of fiber optic adapter 302, including but not limited to fiber optic adapters compatible with Lucent connectors (LC), Subscriber Connector (SC), multi-fiber connectors (MPO, MTP), etc.

Figure 4:
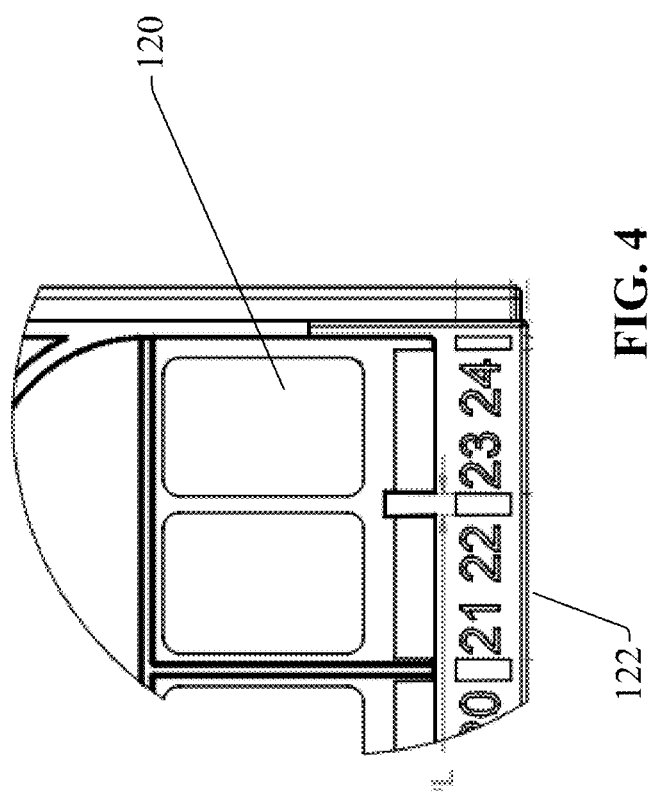
FIG. 4 is a close-up view of a portion of the example fiber optic cassette showing a detailed view of two access openings.

An access opening 120 is located rearward of each fiber adapter receptacle 122 on the bottom inside surface of the fiber optic cassette 102 to provide visual and physical access to the rear sides of fiber optic adapters 302 even if the top side of fiber optic cassette 102 is closed (i.e., the cover 304 is mounted to the top side of the fiber optic cassette 102). FIG. 4 is a close-up view of section A of the fiber optic cassette 102 (indicated in FIG. 2), showing a closer view of two of the access openings 120. Access openings 120 can be used to view the connections between connectors 310 and the rear sides of fiber optic adapters 302 (see FIG. 3), as well as provide physical access to assist in removal of connectors 310 from the rear sides of fiber optic adapters 302.

Splice holders 104 (see, e.g., FIGS. 1-3, 5) are located on the left side of fiber optic cassette 102. In some embodiments, splice holders 104 can be an integrated, non-removable feature of fiber optic cassette 102 (e.g., a continuous molded structure of the fiber optic cassette 102). Alternatively, in some embodiments splice holder 104 can be a removable component that can be clipped to, and removed from, fiber optic cassette 102. As will be further described below in connection with FIG. 7, splice holders 104 are configured to hold splices that connect the ends of incoming optical fibers that enter the fiber optic cassette 102 via one of the four rear entrance openings 126 to the unterminated ends of patching fibers 308 (see FIG. 3). Splice holders 104 thus effect connectivity between the optical fibers entering fiber optic cassette 102 rearwardly via rear entrance openings 126 connectorized external fibers plugged into the receptacles 314 of fiber optic adapters 302.

Figure 5:
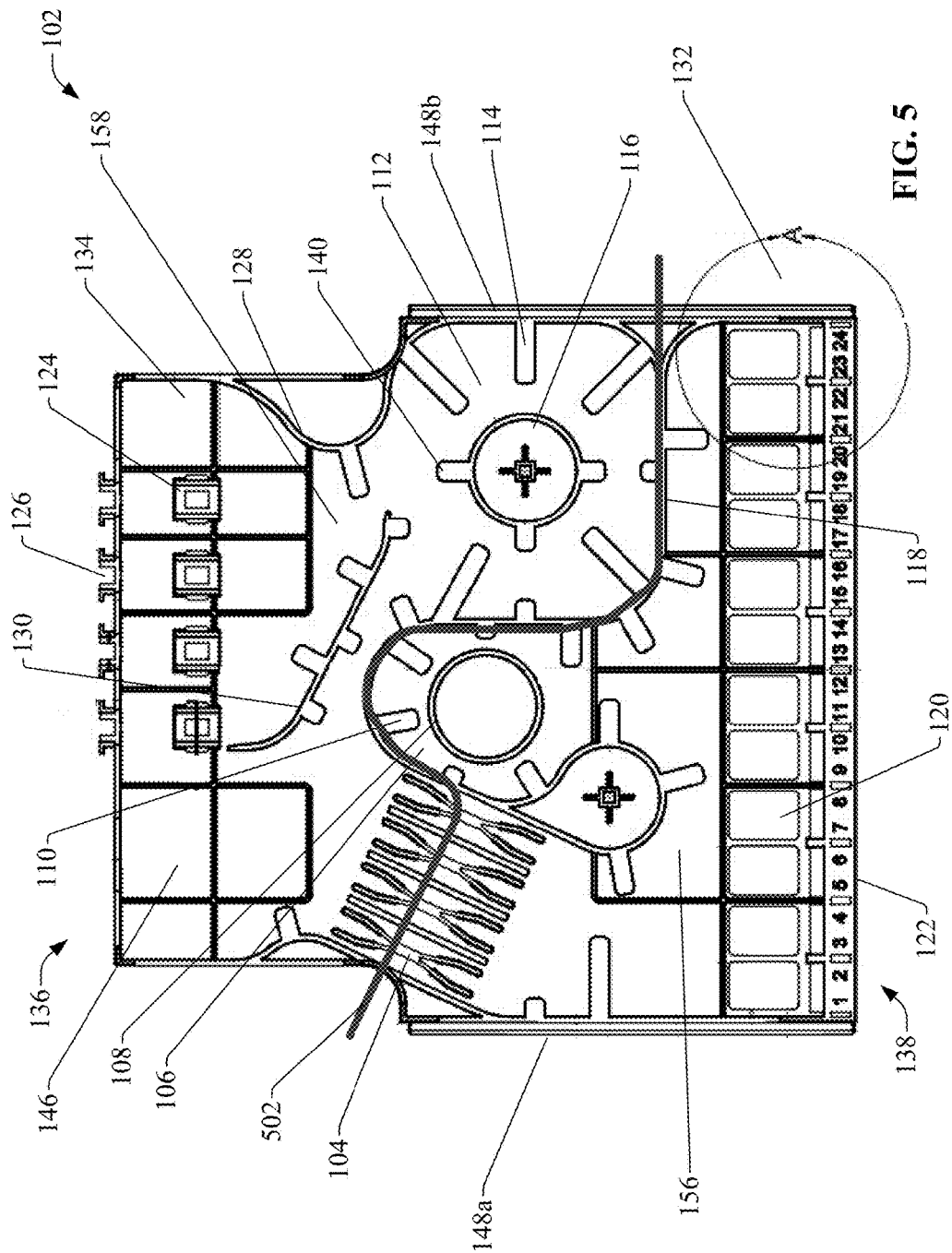
FIG. 5 is a top view of the example fiber optic cassette with an overlaid demarcation line demarking areas of separation created by a dividing wall and splice holders.

A dividing wall 118 (see, e.g., FIGS. 1-3, 5-7) is formed on the bottom inside surface 134 of fiber optic cassette 102. Dividing wall 118, together with splice holders 104, define two chambers—a rear chamber 158 and a front chamber 156—that facilitate separation of incoming optical fibers and patching fibers 308 (see, e.g., FIGS. 1-2, 5-6). FIG. 5 is a top view of fiber optic cassette 102 with an overlaid demarcation line 502 demarking the areas of separation created by dividing wall 118 and splice holders 104. The area above demarcation line 502 is a rear chamber 158 configured to contain the incoming optical fibers received in the fiber optic cassette 102 via rear entrance openings 126, which will be routed from the rear entrance openings 126 to the splice holders 104. The area below demarcation line 502 is a front chamber 156 configured to contain the connectorized patching fibers 308, the free, rearward ends of which are retained within splice holders 104 to the fiber optic adapters 302.

Figure 7:
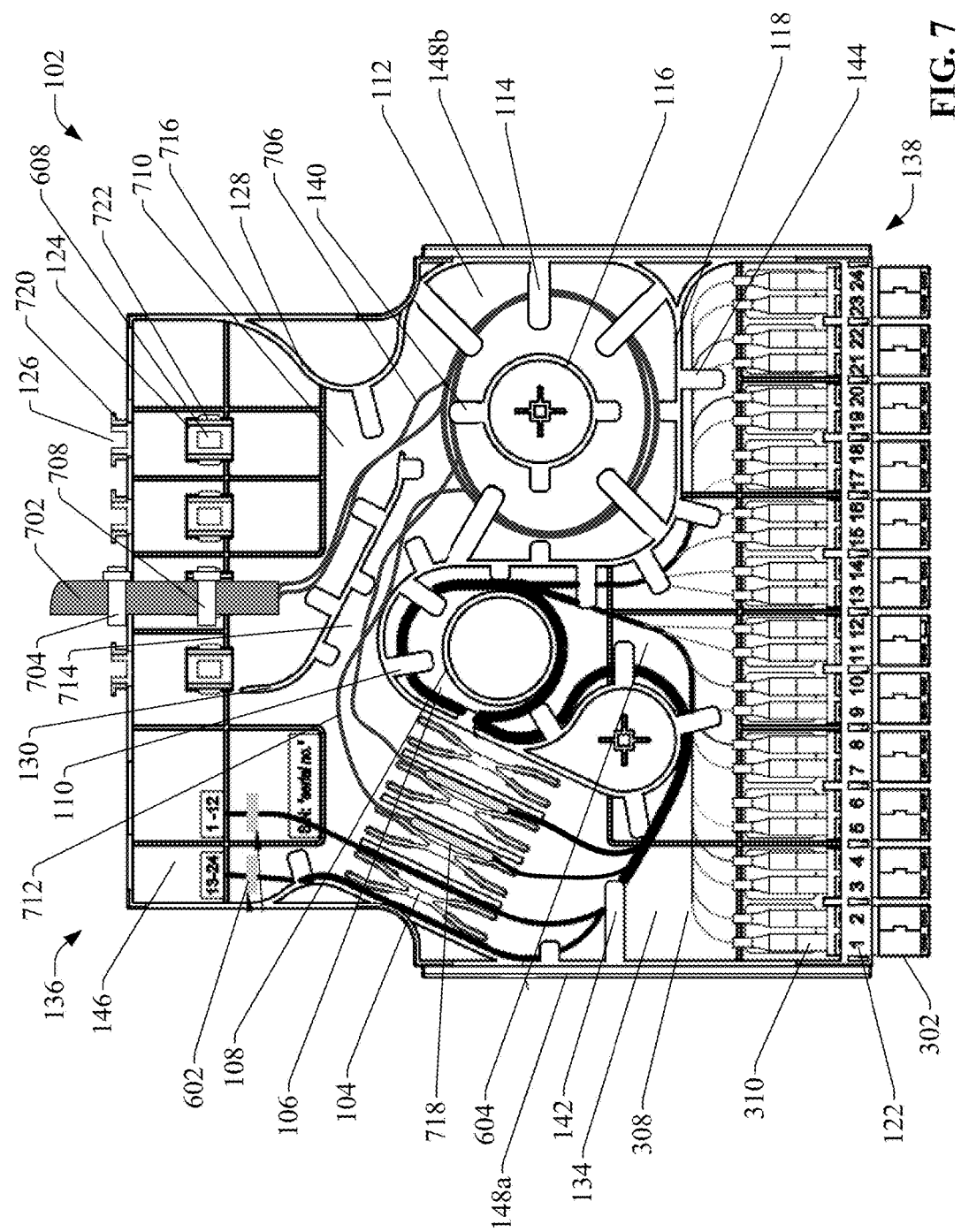
FIG. 7 is a top view of the example fiber optic cassette in which a fiber optic cable has been installed.

As shown in, for example, FIGS. 1 and 7, a first winding area 112 is located in the rear section behind dividing wall 118, and contains a first winding structure 116 for holding excess loops of incoming optical fiber. Multiple retaining tabs 114 are formed on the side of dividing wall 118 within the first winding area 112 facing the rear chamber 158, and project toward the first winding structure 116. Retaining tabs 114 are elevated above, and are substantially parallel to, the bottom inside surface 134 of the fiber optic cassette 102, so that incoming optical fibers that are wound around winding structure 116 can be routed underneath the retaining tabs 114. Retaining tabs 114 hold the excess fiber in place and reduce movement of the excess fiber while the fiber optic cassette 102 is being moved (e.g., when the fiber optic cassette 102 is being loaded into or unloaded from a panel, cabinet, or tray), as well as ensure that the optical fibers are not pinched when the cover 304 is placed on the top of the fiber optic cassette 102. In some embodiments, multiple retaining tabs 140 can also be formed on the first winding structure 116 itself. In such embodiments, retaining tabs 140 can be formed along a top edge of the first winding structure 116 and radiate away from the center of the first winding structure 116. These retaining tabs 140 can prevent incoming optical fibers that are wound around the first winding structure 116 from sliding off the first winding structure 116. Retaining tabs 114 and/or 140, in combination with first winding structure 116, are configured to maintain appropriate bend radius control of retained optical fibers to avoid damaging such optical fibers.

A second winding area 106 is located in the front chamber 156 in front of the dividing wall 118, and contains a second winding structure 108 for holding excess loops of patching fiber 308. Similar to the first winding area 112, a number of retaining tabs 110 are formed on the dividing wall in the second winding area 106. Retaining tabs 110 project toward the second winding structure 108, and are formed on the side of dividing wall 118 facing the front chamber 156 of the fiber optic cassette 102 (the side of dividing wall 118 opposite the side on which retaining tabs 114 are formed). Retaining tabs 110 are elevated above the bottom inside surface 134 of the fiber optic cassette 102 to allow patching fibers that are wound around the second winding structure 108 to pass underneath the retaining tabs 110. Like first winding area 112, structures within second winding area 106 are configured to maintain appropriate bend radius control of retained optical fibers to avoid damaging such optical fibers.

Figure 6:
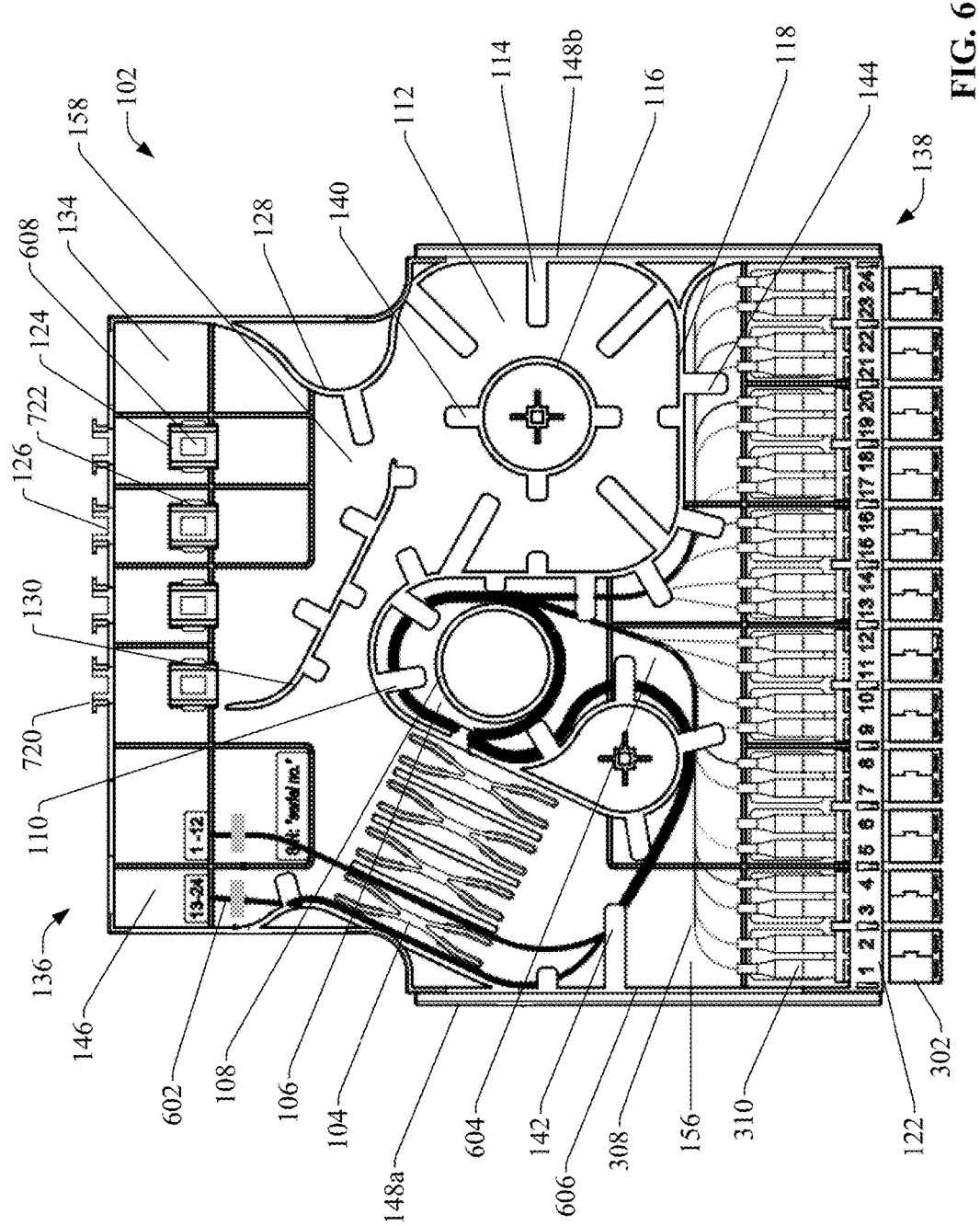
FIG. 6 is a top view of the example fiber optic cassette with patching fibers installed in the front section of the fiber optic cassette.

FIG. 6 is a top view of fiber optic cassette 102 with patching fibers 308 installed in the front chamber 156 of fiber optic cassette 102. As shown in FIG. 6, fiber optic adapters 302 have been installed into respective fiber adapter receptacles 122 are located along the front end 138 of fiber optic cassette 102. Patching fibers 308 have been terminated with connectors 310 and plugged into the rear sides of the fiber optic adapters 302 inside the fiber optic cassette 102. Each of the patching fibers 308 is routed from its respective fiber optic adapter 302 to the second winding structure 108 and excess lengths of the patching fibers 308 are wound around the second winding structure 108, such that the wound lengths of patching fibers 308 reside between the second winding structure 108 and the dividing wall 118. To guide the patching fibers 308 to the second winding area, the dividing wall 118 can be curved to form a first pathway 604 from the fiber adapter receptacles 122 to the second winding area 106. Additional retaining tabs (e.g., retaining tab 144) can be formed along the length of the dividing wall 118 to hold the patching fibers 308 in place along their route to the second winding structure 108.

After the excessive lengths of the patching fibers 308 have been wound around the second winding structure 108, the remaining lengths of the patching fibers 308 can be routed along the dividing wall 118 to the splice holder 104. Retaining tabs 142 along the inside of the side wall 606 of the fiber optic cassette 102 (see FIG. 6) can help to retain the portions of the patching fibers 308 that approach the splice holder 104.

In the example scenario illustrated in FIG. 6, there are no incoming fiber optic cables entering the fiber optic cassette 102 via rear entrance openings 126. In this scenario, the fiber optic cassette 102 serves as a "stand-by" cassette that is available to receive a fiber optic cable containing optical fibers, which can be broken out within the fiber optic cassette 102 and optically connected to respective one or more of the fiber optic adapters 302 via patching fibers 308 (as will be described and illustrated in connection with FIG. 7). Prior to use of the fiber optic cassette 102 to break out an incoming fiber optic cable, the ends 602 of the patching fibers 308 can pass through the splice holders 104 and be affixed in a spare patching fiber area 146. In some embodiments, the ends 602 of the patching fibers 308 can be affixed to the inside bottom surface of the fiber optic cassette 102 using tape or another type of adhesive. In other embodiments, the spare patching fiber area 146 can include attachment features that allow the ends 602 of the patching fibers to be held in place with another type of attachment mechanism (e.g., wire-ties, snaps, clips, etc.). In the example illustrated in FIG. 6, patching fibers 308 have been bundled into two groups of 12 fibers—first bundle 1-12 and second bundle 13-24—and each group has been affixed separately in the spare patching fiber area 146.

FIG. 7 is a top view of fiber optic cassette 102 in which a fiber optic cable 702 has been installed. Although only one fiber optic cable 702 is depicted in FIG. 7, embodiments of the fiber optic cassette 102 can have multiple rear entrance openings 126 along the rear end 136, allowing the fiber optic cassette 102 to accommodate multiple incoming fiber optic cables 702. Four rear entrance openings 126 are depicted in the example embodiment depicted in FIG. 7; however, other embodiments of fiber optic cassette 102 may include more or fewer rear entrance openings 126.

Fiber optic cable 702, which contains multiple individual optical fibers 706, can pass through one of the rear entrance openings 126 to enter the fiber optic cassette 102. Attachment features on the rear entrance opening 126 and its associated cable fixing point 124—located near the rear entrance opening 126 on the bottom inside surface 134—allow the incoming fiber optic cable 702 to be fixed to the cassette at two points. For example, each rear entrance opening 126 can include a mounting structure 720 capable of receiving a first cable tie 704 (or another type of attachment mechanism), thereby allowing fiber optic cable 702 to be attached to the fiber optic cassette 102 at a first point using the first cable tie 704. Similarly, each cable fixing point 124 can include a mounting structure 722 capable of receiving a second cable tie 708 (see FIG. 7), thereby allowing fiber optic cable 702 to be attached to the fiber optic cassette 102 at a second point using the second cable tie 708. In some embodiments, rather than using cable ties 704, one or both of the rear entrance opening 126 or the cable fixing point 124 can include an integrated attachment mechanism—such as a snap mechanism or a hinged clip (not shown)—configured to attach the fiber optic cable 702 to the fiber optic cassette 102. The use of dual fixing points to attach the fiber optic cable 702 to the fiber optic cassette 102 in this manner can limit movement of the fiber optic cable 702 within the fiber optic cassette 102 and minimize stress on the optical fibers 706 housed within the fiber optic cable 702.

The incoming optical fibers 706 of the fiber optic cable 702 can be routed to the first winding area 112, where excess lengths of the incoming optical fibers 706 can be wound around the first winding structure 116. To guide the incoming optical fibers to the first winding area 112, a rear portion 128 of dividing wall 118 and a guiding wall 130 that is separate from the dividing wall 118 form a second pathway 710 that runs between the rear entrance openings 126 and the first winding area 112. To form this pathway 710, the rear portion 128 of dividing wall 118 comprises a portion of dividing wall 118 that runs to the rear of the fiber optic cassette 102 along the right-side wall 716 and arches away from the right-side wall 716 toward the guiding wall 130. As shown in FIG. 7, the second pathway 710 formed by the rear portion 128 of dividing wall 118 and the guiding wall 130 is wide enough on the rear side to accommodate the rear entrance openings 126 and receive the incoming optical fibers 706. The second pathway 710 narrows near the first winding area 112 in order to guide the incoming optical fibers 706 to the first winding area 112. To achieve this narrowing, the guiding wall 130 is angled toward the rear portion 128 of the dividing wall 118, while the rear portion 128 of the dividing wall 118 is curved toward the guiding wall 130. In some embodiments, both the guiding wall 130 and the rear portion 128 of dividing wall 118 can include retention tabs to limit movement of the incoming optical fibers 706.

In the first winding area 112, excess lengths of the incoming optical fibers 706 can be wound around the first winding structure 116, as shown in FIG. 7. The ends 712 of the incoming optical fibers 706 can then be routed to the splice holders 104, where the ends 712 of the incoming optical fibers 130 are spliced to ends of corresponding patching fiber 308. To guide the ends 712 of incoming optical fibers 706, guiding wall 130 and dividing wall 118 form a third pathway 714 that runs between the first winding area 112 and the splice holders 104.

In the example depicted in FIG. 7, the ends 712 of two of the incoming optical fibers 706 are spliced to respective patching fibers 308 using fiber splices 718, and the fiber splices 718 are held in place by the splice holders 104. The two patching fibers 308 can be separated from their corresponding bundles affixed in the spare patching fiber area 146, and thereafter spliced to the ends 712 of the incoming optical fibers 706 as needed. Thus, optical connectivity is established between incoming optical fibers 706 from fiber optic cable 702 and corresponding fiber optic adapters 302 along the front side 138 of fiber optic cassette 102.

As illustrated in FIG. 7, the orientation of the dividing wall 118 relative to the rear entrance openings 126, the fiber adapter receptacles 122, the first winding area 112, and the second winding area 106, maintains segregation between the incoming optical fibers 706 and the patching fibers 308 within the fiber optic cassette 102 until the incoming optical fibers 706 and the patching fibers 308 are spliced at the splice holders 104. Dividing wall 118 is a continuous wall that curves around the first winding area 112 and the second winding area 106 in a manner that prevents optical fibers from crossing between the two winding areas 112 and 106, while also forming a pathway 710 (together with guiding wall 130) between the rear entrance openings 126 and the first winding area 112, and another pathway 604 between the fiber adapter receptacles 122 and the second winding area 106. Dividing wall 118 also curves in a manner that allows patching fibers 308 to be routed along the dividing wall 118 from the second winding area 106 to the splice holders 104, and that forms a pathway 714 (together with guiding wall 130) for routing incoming optical fibers 706 from the first winding area 112 to the splice holders 104 to be spliced to the patching fibers 308. This architecture ensures that the splice points held in place by splice holders 104 are the only points of contact between the incoming optical fibers 706 and the patching fibers 308.

By maintaining segregation between the incoming optical fibers 706 and the patching fibers 308 in this manner, embodiments of fiber optic cassette 102 can prevent entanglement between the incoming optical fibers 706 and the patching fibers 308 and facilitate easy access to individual optical fibers as needed, even in high-density applications. Retention tabs distributed along the dividing wall 118 and guiding wall 130 further limit movement of the optical fibers within the fiber optic cassette 102. The dual cable fixing points supported by the rear entrance openings 126 and the cable fixing points 124 can also limit movement of incoming fiber optic cables (e.g., fiber optic cable 702). Moreover, all dividing, routing, and retaining elements are configured to ensure bend radius control of optical fibers within fiber optic cassette 102.

Figure 8:
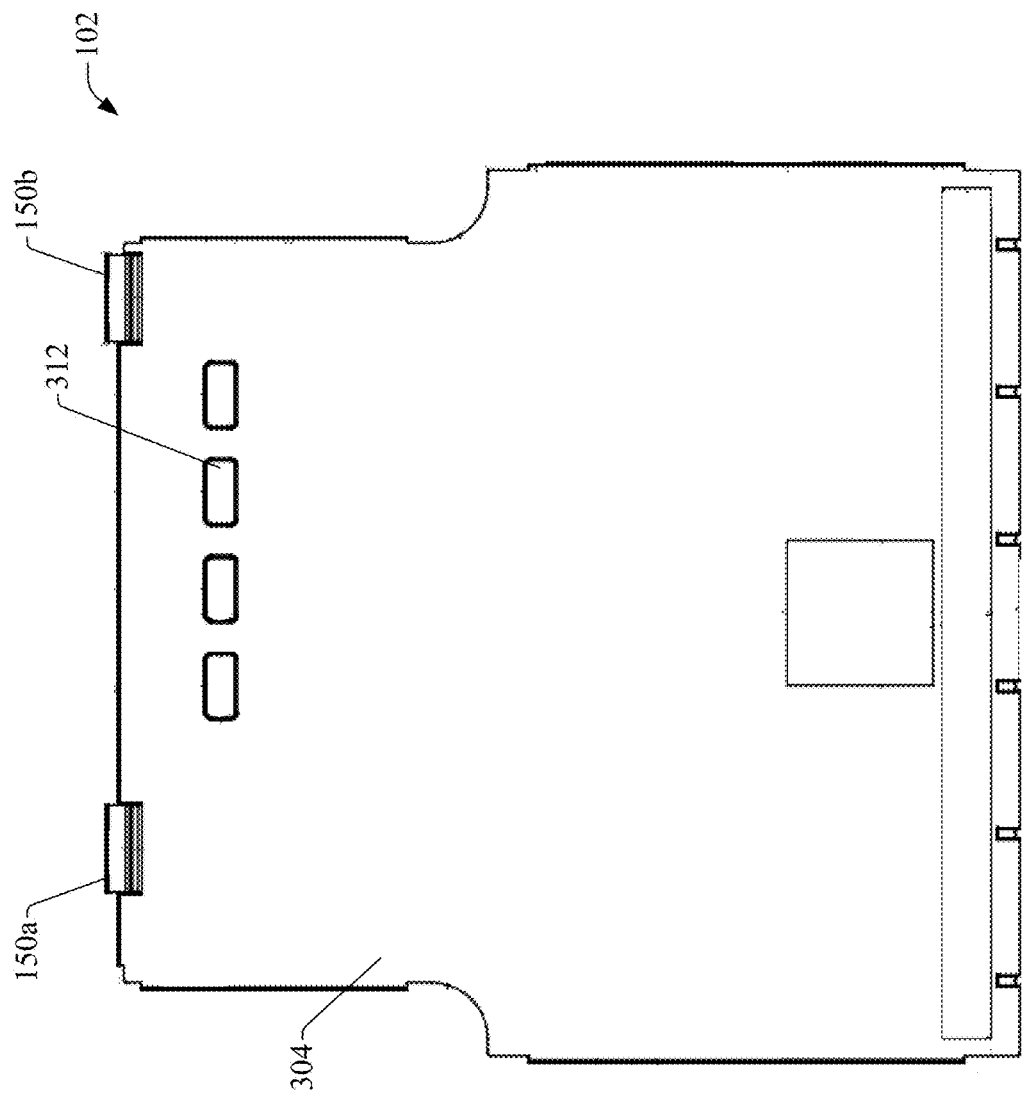
FIG. 8 is a top view of the example fiber optic cassette with a cover mounted to the top of the fiber optic cassette.

FIG. 8 is a top view of cover 304, which can be mounted to the top of the fiber optic cassette 102. Although cover 304 is depicted as being opaque in FIG. 8, some embodiments of cover 304 may be transparent or translucent to afford visibility inside the fiber optic cassette 102.

In the example embodiment depicted herein, two spring-loaded clips 150a and 150b are located on the rear edge of cover 304. FIG. 9 is a side view of cover 304 depicting features of clips 150a and 150b in more detail. Each of the clips 150a and 150b has formed thereon a protrusion 802 configured to engage with elongated apertures 152a and 152b formed on the rear wall 154 of fiber optic cassette 102 (see, e.g., FIG. 1) while the cover 304 is mounted on the fiber optic cassette 102. Clips 150a and 150b are curved to create a spring-loaded force in the rear-ward direction while the protrusions 802 are engaged with the elongated apertures 152a and 152b, thereby maintaining engagement between the protrusions 802 and apertures 152a and 152b while the cover 304 is mounted on the fiber optic cassette 102. The engagement between the protrusions 802 and apertures 152a and 152b locks cover 304 in place on the fiber optic cassette. The cover 304 can be released from the fiber optic cassette 102 by applying opposing pressure on the clips 150a and 150b to disengage the protrusions 802 from the elongated apertures 152a and 152b. It is to be appreciated that the example clips 150a and 150b are only intended to be exemplary, and that any suitable attachment mechanism can be used to fix cover 304 to fiber optic cassette 102 without departing from the scope of this disclosure.

In some embodiments, cover 304 can include openings 312 located over the respective cable fixing points 124 to allow physical and visual access to the incoming fiber optic cables 702 and associated attachment mechanisms (e.g., cable ties). Openings 312, together with corresponding openings 608 located on cable fixing points 124, can also provide clearance for incoming fiber optic cables 702, allowing the fiber optic cassette 102 to accept and retain fiber optic cables 702 of larger diameters than could be accommodated without openings 312 and 608.

Although the fiber segregation features described herein have been illustrated in the context of a fiber optic cassette 102 having a shape depicted in FIGS. 1-9, the segregation features (e.g., the arrangement of the dividing wall 118, guiding wall 130, first winding area 112, and second winding area 106) are not limited to embodiments within such fiber optic cassettes 102. Rather, the segregation features can be embodied in substantially any type of enclosure in which optical fibers are housed. This can include, for example, embodiments in which fiber optic cassettes (with or without a cover) having hinges on their exterior sides are configured to mount inside a vertical fiber optic cabling cabinet. In such embodiments, each fiber optic cassette may be configured to pivot about the hinge between a retracted position in which the optical fibers are enclosed within the cabinet and an extended position in which the optical fibers are exposed and accessible. Other types of optical fiber enclosures having fiber segregation features described herein are also within the scope of one or more embodiments of this disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A fiber optic cassette, comprising:
   one or more splice holders configured to hold fiber optic splices that connect first ends of incoming optical fibers to second ends of patching fibers;
   a first winding area comprising a first winding structure configured to hold first excess lengths of the incoming optical fibers;
   a second winding area comprising a second winding structure configured to hold second excess lengths of the patching fibers; and
   a dividing wall that curves around the first winding area and the second winding area, wherein at least a portion of the dividing wall is between the first winding structure and the second winding structure, and the dividing wall prevents the incoming optical fibers from crossing the patching fibers.

2. The fiber optic cassette of claim 1, further comprising at least one rear entrance opening located on a rear wall of the fiber optic cassette, wherein the at least one rear entrance opening is configured to receive at least one fiber optic cable comprising the incoming optical fibers.

3. The fiber optic cassette of claim 2, wherein the portion of the dividing wall is a first portion, and the fiber optic cassette further comprises a guiding wall, wherein the guiding wall and at least a second portion of the dividing wall define a pathway between the at least one rear entrance opening and the first winding area.

4. The fiber optic cassette of claim 3, wherein the guiding wall and at least a third portion of the dividing wall define another pathway between the first winding area and the one or more splice holders.

5. The fiber optic cassette of claim 3, wherein the guiding wall comprises retaining tabs that protrude from a first side and a second side of the guiding wall.

6. The fiber optic cassette of claim 2, further comprising at least one cable fixing point located on a bottom inside surface of the fiber optic cassette in front of the at least one rear entrance opening, wherein the at least one cable fixing point comprises an attachment mechanism configured to attach the fiber optic cable to the bottom inside surface of the fiber optic cassette.

7. The fiber optic cassette of claim 1, wherein the dividing wall comprises retaining tabs that project from a first side and a second side of the dividing wall.

8. The fiber optic cassette of claim 1, further comprising fiber adapter receptacles located on a front side of fiber optic cassette and configured to hold fiber optic adapters, wherein the fiber optic adapters are configured to hold respective third ends of the patching fibers opposite the second ends of the patching fibers.

9. The fiber optic cassette of claim 8, wherein the dividing wall defines a first pathway from the front adapter receptacles to the second winding area and a second pathway from the second winding area to the splice holders.

10. The fiber optic cassette of claim 8, further comprising access openings on a bottom surface of the fiber optic cassette and respectively located below the fiber adapter receptacles.

11. The fiber optic cassette of claim 1, further comprising a first mounting rail and a second mounting rail on a first external side and a second external side, respectively, of the fiber optic cassette.

12. The fiber optic cassette of claim 1, further comprising a cover configured to mount on a top side of the fiber optic cassette.

13. A fiber optic cassette, comprising:
    a housing;
    a splice holder on a bottom inside surface of the housing,
    a dividing wall on the bottom inside surface of the housing that segregates a first winding area containing a first winding structure and a second winding area containing a second winding structure, wherein a portion of the dividing wall traverses between the first winding structure and the second winding structure; and
    a guiding wall on the bottom inside surface of the housing,
    wherein
    the dividing wall and the guiding wall define a first path from a rear entrance opening on a rear wall of the housing and the first winding area, and a second path between the first winding area and a first side of the splice holder,
    the dividing wall defines a third path from fiber adapter receptacles on a front wall of the housing to the second winding area, and a fourth path from the second winding area to a second side of the splice holder, and the dividing wall prevents incoming optical fibers that traverse from the rear entrance opening to the splice holder from crossing patching fibers that traverse from the fiber adapter receptacles to the splice holder.

14. The fiber optic cassette of claim 13, wherein the guiding wall separates the first path and the second path.

15. The fiber optic cassette of claim 13, wherein the dividing wall comprises a first retention tab that protrudes from a top edge of the dividing wall and is substantially parallel with the bottom inside surface, and the guiding wall comprises a second retention tab that protrudes from a top edge of the guiding wall and is substantially parallel with the bottom inside surface.

16. The fiber optic cassette of claim 13, further comprising a cable fixing point located on the bottom inside surface of the housing, wherein the cable fixing point is aligned with the rear entrance opening and is configured to facilitate attachment of a corresponding fiber optic cable to the bottom inside surface of the housing.

17. A fiber optic housing, comprising:

one or more rear entrance openings on a rear end of the fiber optic housing, the one or more rear entrance openings configured to receive respective one or more fiber optic cables;

one or more fiber adapter receptacles on a front end of the fiber optic housing, the one or more fiber adapter receptacles configured to receive respective one or more fiber optic adapters; and a dividing wall that defines a first fiber pathway from the one or more rear entrance openings to a splice holder via a first winding area and a second fiber pathway from the one or more fiber adapter receptacles to the splice holder via a second winding area, wherein at least a portion of the dividing wall traverses between a first winding structure in the first winding area and a second winding structure in the second winding area, and the dividing wall maintains separation between optical fibers of the one or more fiber optic cables that traverse the first fiber pathway and patching fibers that traverse the second fiber pathway.

18. The fiber optic housing of claim 17, wherein the splice holder is configured to hold splices that connect at least one of the optical fibers to at least one of the patching fibers.

19. The fiber optic housing of claim 17, further comprising a guiding wall that further defines the first fiber pathway.

20. The fiber optic housing of claim 19, wherein the portion of the dividing wall is a first portion, the guiding wall and a second portion of the dividing wall define a first segment of the first fiber pathway from the one or more rear entrance openings to the first winding area, and the guiding wall and a third portion of the dividing wall define a second segment of the first fiber pathway from the first winding area to the splice holder.

* * * * *